United States Patent [19]

Campbell et al.

[11] Patent Number: 4,827,479
[45] Date of Patent: * May 2, 1989

[54] DENSITY GRADIENT FREE ELECTRON COLLISIONALLY EXCITED X-RAY LASER

[75] Inventors: Edward M. Campbell, Pleasanton; Mordecai D. Rosen, Berkeley, both of Calif.

[73] Assignee: The United States of America as represented by the United States Department of Energy, Washington, D.C.

[*] Notice: The portion of the term of this patent subsequent to Feb. 2, 2005 has been disclaimed.

[21] Appl. No.: 676,338

[22] Filed: Nov. 29, 1984

[51] Int. Cl.$^4$ ................................................ H01S 3/30
[52] U.S. Cl. .......................................... 372/5; 372/7; 372/39; 372/1; 372/66
[58] Field of Search .................... 372/5, 7, 66, 39, 1

[56] References Cited

U.S. PATENT DOCUMENTS 4,589,113 5/1986 Hagelstein .............................. 372/5

OTHER PUBLICATIONS

Elton, "Quasi-Stationary Population Inversion on Kα Transitions", Appl. Opt. vol. 14(9), Sep. 1975.
Zherikhin et al, "Gain in the Far Vacuum uv. Region Due to Transitions in Multiply Charged Ions", SJQE 6(1) Jan. '76.
Vinogradov et al, "Population Inversion of Transitions in Neon-Like Ions", SJQE 7(1) Jan. '77.
Hagelstein, "Review of Radiation Pumped Soft X-ray Lasers", Plasma Phys. (25) No. 12, 1983.

Primary Examiner—Leon Scott, Jr.
Attorney, Agent, or Firm—Gary C. Roth; Clifton E. Clouse, Jr.; Judson R. Hightower

[57] ABSTRACT

An operational X-ray laser (30) is provided that amplifies 3p–3s transition X-ray radiation along an approximately linear path. The X-ray laser (30) is driven by a high power optical laser. The driving line focused optical laser beam (32) illuminates a free-standing thin foil (34) that may be associated with a substrate (36) for improved structural integrity. This illumination produces a generally cylindrically shaped plasma having an essentially uniform electron density and temperature, that exists over a long period of time, and provides the X-ray laser gain medium. The X-ray laser (30) may be driven by more than one optical laser beam (32, 44). The X-ray laser (30) has been successfully demonstrated to function in a series of experimental tests.

19 Claims, 6 Drawing Sheets

DENSITY GRADIENT FREE ELECTRON COLLISIONALLY EXCITED X-RAY LASER

The U.S. Government has rights in this invention pursuant to Contract No. W-7405-ENG-48 between the U.S. Department of Energy and the University of California for the operation of the Lawrence Livermore National Laboratory.

BACKGROUND OF THE INVENTION

The invention described herein relates generally to X-ray lasers, and more particularly to optical laser driven electron collisionally excited X-ray lasers.

During a period extending back from the present time for more than two decades, an intense search has been underway for ways of achieving, in the laboratory, laser emission at X-ray wavelengths. Coherent beams of X-rays produced by these lasers will have many beneficial scientific purposes, such as submicroscopic imaging, holography and spectroscopy. Although population inversions in plasmas of the type believed necessary to achieve X-ray lasing have been reported, no experiment providing conclusive or unrefuted evidence of the laser amplification of X-rays has yet been reported in the prior art.

One proposed generic high power optical laser-driven X-ray laser scheme that is currently being actively studied is the electron collisionally excited approach that is theoretically discussed by Elton in Applied Optics 14, 2243 (1975). This approach is also discussed by Zherikhin et al. in Sov. J. Quant. Electron. 6, 82 (1976). Zherikhin et al. theoretically speculate that electron collisions may establish a population inversion in ions with a ground electronic configuration $1s^2 2s^2 2p^m$ as a result of $2p^{m-1}3s - 2p^{m-1}3p$ transitions. The upper state $2p^{m-1}3p$ decays radiatively most effectively to the $2p^{m-1}3s$ state. While this lower state rapidly decays via a strong dipole transition, the radiative decay of the $2p^{m-1}3p$ state to the ground state $1s^2 2s^2 2p^m$ is forbidden. Both of the states involved in the laser transition levels are thought to be primarily populated from the ground state as the result of electron impact. Additional pumping mechanisms, such as cascade from higher lying energy states, for example the $1s^2 2s^2 2p^{m-1}3d$ states, may be involved in the lasing process. Zherikhin et al. state that neon-like ions are most suitable for this scheme because they are relatively easy to produce and, in plasmas appropriate for high gain, they are the longest lived ions of those having the $2p^m$ configuration. These features are caused by the large ionization potential of the filled 2p shell. Neon-like ions are atoms having an atomic number greater than ten that are stripped of all but ten of their usual complement of electrons. Zherikhin et al. calculate appreciable gains for plasmas composed of neon-like ions of elements in the atomic number range from 16 to 25 heated by two-stage laser pumping, wherein the electron component of a previously generated laser plasma filament is rapidly heated by an ultrashort pulse of high-power laser radiation traveling along the plasma filament. Because of theoretical difficulties, Zherikhin et al. state that it is not clear whether the method can be extended to high atomic number plasma systems.

Vinogradov et al., in Sov. J. Quantum Electron. 7, 32 (1977), consider the electron collisionally excited approach to high power optical laser-driven X-ray lasing under discussion and theorize that 3p-3s transitions can be inverted in optically thin, steady-state plasmas comprising neon-like ions carrying a charge between 7 and 15. Specific numerical results are given for the Ca XI ion. Calcium has the atomic number 20. An important finding of Vinogradov et al. is that two-stage laser pumping is not an absolute theoretical requirement of this electron collisionally-excited method.

As currently understood theoretically, the electron collisionally excited, single pass X-ray laser scheme involves using a driving conventional high power optical laser to produce a mid- to high-density plasma of neon-like ions. Strong monopole electron collisional excitation from the ground state of the neon-like ions fills 3p states. This inverts 3p-3s transitions because the lower energy 3s states radiatively decay very rapidly. Although the physics of the scheme is complex, it is nevertheless believed that strong 3p excitations may occur for neon-like ions produced from elements having an atomic number near 36 in systems driven by 0.53 micron wavelength laser light at an intensity of about $10^{13}$ to $10^{14}$ watts/cm$^2$. The gain, usually stated in terms of reciprocal centimeters, of a transition produced by this scheme is believed to be a function of the parameters of the driving conventional high power optical laser pulse, the atomic number of the element comprising the plasma, the free electron density of the plasma, the electron temperature of the plasma, and, because of potential radiation trapping, the dimensions of the plasma. Two-stage laser pumping is not required.

An attempt was made to experimentally test the electron collisionally excited, single pass X-ray laser scheme at the NOVETTE laser facility of the Lawrence Livermore National Laboratory. The experimental arrangement is schematically shown in FIG. 1, prior art, to which reference is now made. Laser pulse 10, comprised of a 200 picosecond full width at half maximum amplitude, 0.53 micron wavelength, cylindrically focused light pulse having an average intensity of approximately $10^{14}$ watts/cm$^2$, was directed onto a selenium panel 12, which was approximately 1,000 Angstroms thick. Selenium panel 12 was coated on a parylene substrate 14, which was approximately 0.5 microns thick. Parylene substrate 14 was supported within an aluminum trough 16. Laser pulse 10 caused a plasma, formed from blown-off selenium atoms, to come into existence adjacent to selenium panel 12. According to calculations performed on the Lawrence Livermore National Laboratory LASNEX computer code, and other computer codes, conditions within the plasma should have been such as to produce lasing emission at approximately 68 eV from neon-like selenium atoms by the electron collisionally excited mechanism. More particularly, according to the calculations, the plasma was expected to have, over an extended period of time, the electron density and gain, as functions of the distance from the surface of selenium panel 12, shown in FIG. 2, prior art, and in FIG. 3, prior art, respectively. During the lasing time, the plasma was expected to have an electron temperature of about 800 to 1500 eV. An X-ray detector which was carefully adjusted to measure radiation in the 58 to 78 eV energy range that was within an approximately 0.005 radian acceptance angle, monitored axial radiation emission, in a direction through the plasma and parallel to the surface of selenium panel 12, from the high gain portion of the plasma that was confined within approximately 30 microns of the surface of selenium panel 12. Laser amplification was not detected. Since the plasma was optically thin on the 2p-3s line coupling the ground state to the lower laser state, radiation trapping is an unlikely cause of this null result. Radiation trapping is the physical effect whereby the resonant line radiation resulting from the decay of the lower laser state is appreciably trapped within the laser medium and quenches the laser action. More specifically, radiation trapping can result in the interior portions of thick laser media having a very reduced intrinsic efficiency. The effect occurs when the very fast and fully allowed dipole transition radiation that empties the lower lasing state is reabsorbed by another ground state atom, thereby establishing an equilibrium which tends to elevate the population of the lower state of the lasing transition, destroy the population inversion, and terminate lasing.

Consequently, at the present time, while calculations such as that described herein have shown the mere theoretical feasibility of producing plasma media having gain in the X-ray region of the spectrum, no substantial X-ray laser amplification has yet been demonstrated. For such a demonstration to be clear and unequivocal, the product of the gain multiplied by the effective length of the X-ray laser amplifying medium should be at least as large as approximately three or four.

Thus, even though the theory underlying the generic electron collisionally excited single pass high power optical laser-driven X-ray laser mechanism is believed to be valid, it is not known in the prior art how to construct an operational X-ray laser of this type.

SUMMARY OF THE INVENTION

It is therefore an object of the invention to provide an operational high power optical laser-driven electron collisionally excited, single pass X-ray laser.

Another object of the invention is to provide method and apparatus for establishing an electron collisionally excited gain medium that laser amplifies 3p-3s transition X-ray radiation along an approximately linear path.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects and in accordance with the purpose of the present invention, as apparatus of this invention may comprise illuminating a free-standing thin foil, comprised of a single element having an atomic number in the inclusive range from 20 to 50 and having a thickness in the range from 50 to 10,000 Angstroms, with a beam of line focused high power optical laser radiation. The laser radiation illuminates a long, thin and generally rectangular portion of the foil. This results in the production of a generally cylindrically shaped plasma that has essentially uniform electron density and temperature, and that exists over an appreciably long period of time. This plasma has essentially no index of refraction gradient to X-ray radiation, and contains a sufficient density of neon-like ions to provide an electron collisionally excited, single pass X-ray laser gain medium that coherently laser amplifies 3p-3s transition X-ray radiation along an approximately linear path within the gain medium.

In some embodiments of the invention, the free-standing thin foil is additionally illuminated or irradiated by a second beam of line focused high power optical laser irradtion. The characteristics of the two line focused optical laser beams are generally similar. The two beams may illuminate the same generally rectangular portion of the foil, from both sides, or the two beams may illuminate two generally rectangular portions of the foil that are generally abuttingly adjacent to one another in a lengthwise manner, from the same or different sides of the foil. The second method increases the length of the gain medium along which X-rays are amplified along an approximately linear path.

In some embodiments of the invention it is preferred to attach the free-standing thin foil onto a substrate, for improved structural integrity. The substrate may be comprised of formvar, beryllium or plastic. It is preferred that the substrate have a thickness of 5000 Angstroms or less.

It is preferred that the driving beams of high power optical laser radiation have a power density in the range from $10^{12}$ to $10^{16}$ watts/cm$^2$, a wavelength in the range from 0.2 to 10.6 microns, and a full width at half maximum amplitude in the range from 100 to 1000 picoseconds. The beams should individually illuminate generally rectangular areas on the foil having length in the range from 0.05 to 5 centimeters, and width in the range from 0.005 to 0.1 centimeters.

Several embodiments of the invention have been experimentally reduced to practice and demonstrated to provide X-ray laser gain media that successfully laser amplify 3p-3s transition X-ray radiation along an approximately linear path. These embodiments have each comprised a selenium foil approximately 750 Angstroms thick, each attached to a formvar substrate approximately 1500 Angstroms thick. These embodiments have employed beams of line focused, optical laser radiation each having a power density of approximately $5\times10^{13}$ watts/cm$^2$, a wavelength of approximately 0.532 microns, and a full width at half maximum amplitude of approximately 450 picoseconds. The line focused beams each illuminated generally rectangular portions of the selenium and formvar target that were approximately 1.12 centimeters long and approximately 0.02 centimeters wide. These successful experimental tests were both of the one-sided and two-sided illumination varieties, as described above.

In other successful experimental tests of the X-ray laser of this invention, foils comprised of yttrium were used.

The benefits and advantages of the present invention, as embodied and broadly described herein, include, inter alia, the provision of an operational high power optical laser driven electron collisionally excited single pass X-ray laser, having a gain medium that coherently laser amplifies 3p-3s transition X-ray radiation along an approximately linear path.

BRIEF DESCRIPTION OF THE DRAWINGS

The accompanying drawings, which are incorporated into and form a part of the specification, illustrate an embodiment of the invention and, together with the description, serve to explain the principles of the invention. In the drawings.

DETAILED DESCRIPTION OF THE INVENTION

Figure 1:
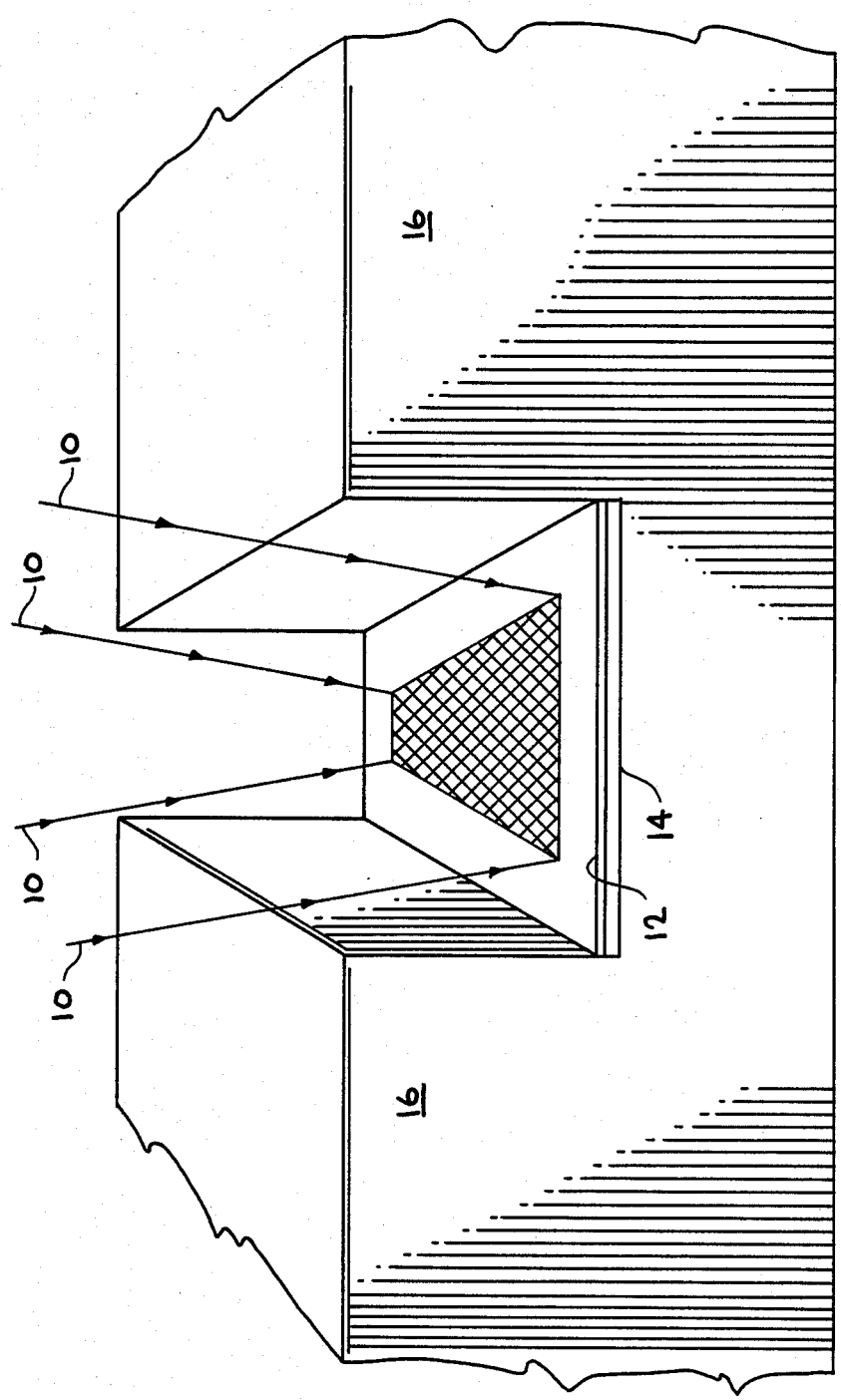
FIG. 1 is a schematic view snowing an unsuccessful prior art attempted experimental test of the electron collisionally excited, single pass X-ray laser scheme.
Figure 2:
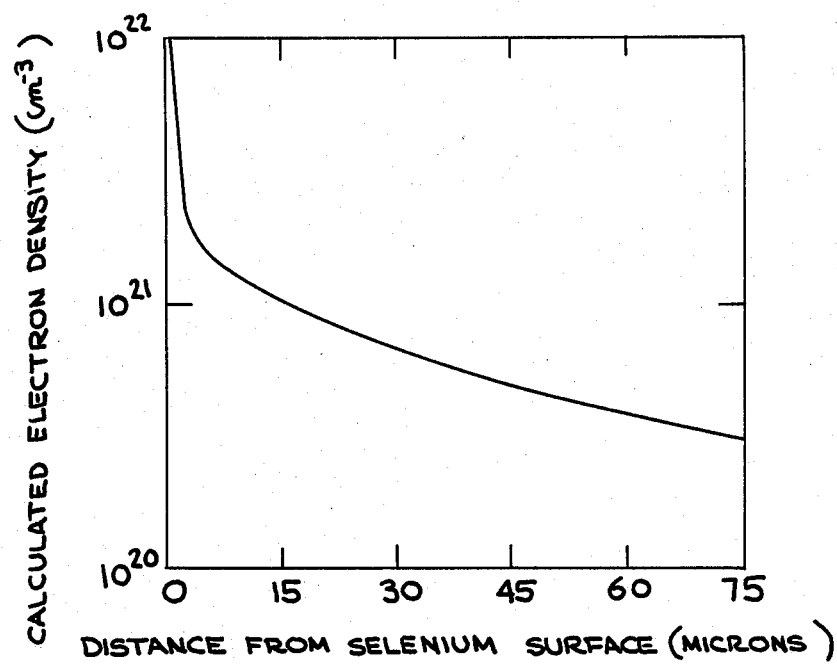
FIG. 2 is a graph showing calculated electron density as a function of distance, for the prior art attempted experimental test of FIG. 1.
Figure 3:
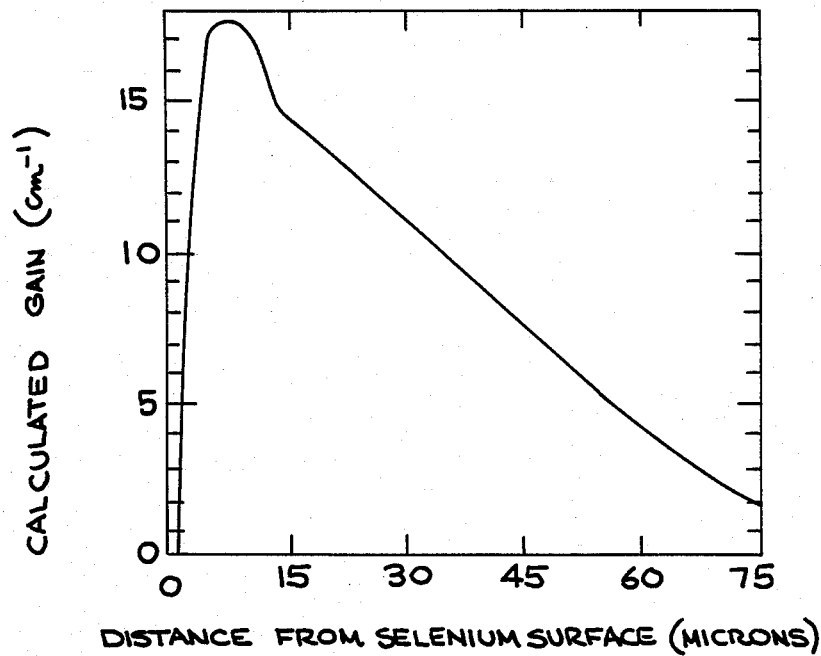
FIG. 3 is a graph showing calculated gain as a function of distance, for the prior art attempted experimental test of FIG. 1.

Reference has been made above to FIG. 1 which shows a schematic view of an unsuccessful prior art attempted experimental test of the electron collisionally excited single pass X-ray laser scheme. Reference has also been made above to FIG. 2 which is a graph showing calculated electron density as a function of distance for the prior art attempted experimental test of FIG. 1, and to FIG. 3 which is a graph showing calculated gain as a function of distance for the prior art attempted experimental test of FIG. 1. It is believed that a reason why no laser amplified short wavelength radiation was detected as having been produced by the prior art electron collisionally excited single pass X-ray laser of FIG. 1, is because index of refraction gradients in the plasma created by laser pulse 10 were sufficient to bend the trajectory of any developing laser amplified 3p–3s transition X-ray radiation so that substantial amplification did not occur, and any radiation that was amplified was not within the acceptance angle of the X-ray detector. Just as light is bent by index of refraction gradients or changes, the same is true for any form of electromagnetic radiation such as X-rays. In other words, in the plasma, X-rays were bent by index of refraction gradients away from regions of high electron density, wherein the phase velocity of light is higher than in regions of lesser electron density. The steeply falling electron density profile resulted in the refraction of X-rays out of the high gain region of the plasma, which prevents their significant amplification. Thus, it is believed that any axial X-ray laser emission, from the high gain portion of the plasma that was confined within approximately 30 microns of the target surface of selenium panel 12, traveling initially in a direction through the plasma and parallel to the target surface of selenium panel 12, would, while undergoing a very small amount of amplification, at the same time be bent and turned away from and out of the high electron density and high gain portion of the plasma. The X-ray detector would have missed such a laser signal. It is consequently also believed that the prior art electron collisionally excited, single pass X-ray laser as shown in FIG. 1 can at best produce a very low-intensity, broad and diffusely directed X-ray laser beam.

Figure 4:
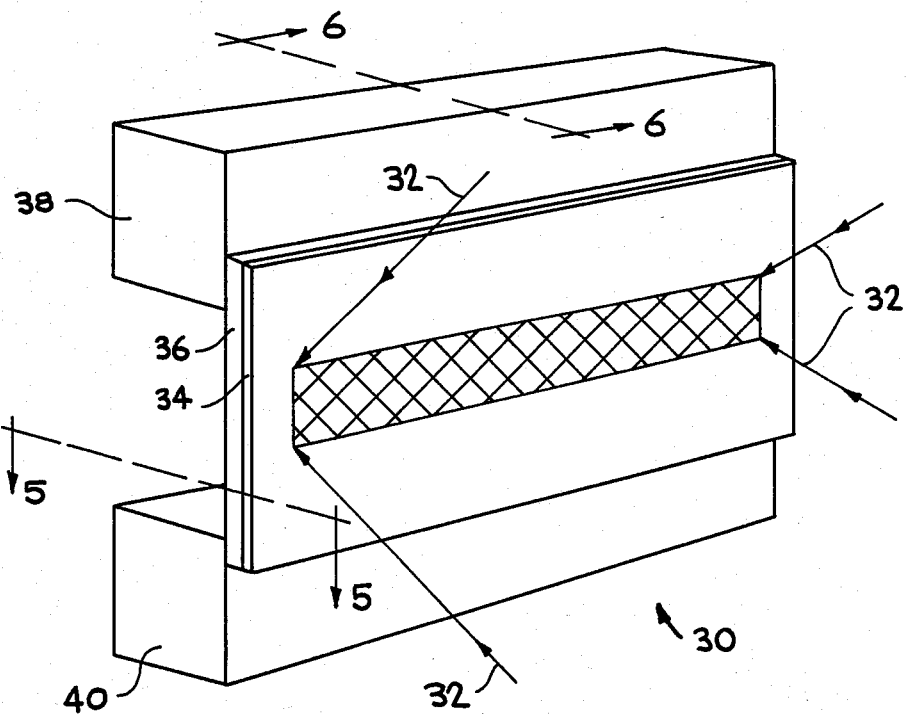
FIG. 4 is a schematic view of an electron collisionally excited, single pass X-ray laser in accordance with the invention.

Reference will now be made in detail to the present preferred embodiment of the invention, an example of which is illustrated in the accompanying drawings. Reference is made to FIG. 4 which is a schematic view of an electron collisionally excited single pass X-ray laser, 30, that coherently laser amplifies 3p–3s transition X-ray radiation along an approximately linear path, in accordance with the invention. The particular mechanical assembly used in the practice of this invention is not critical, and many differently constructed X-ray lasers may be made that are highly efficacious and in accordance with the invention. X-ray laser 30 is driven by conventional laser pulse 32 which is focused to a rectangular area of approximately 1.12 cm by 0.02 cm by a cylindrical lens system. However, in other embodiments of the invention the focus may be to a rectangular area having a length in the range from 0.05 to 5 cm, and a width in the range from 0.005 to 0.1 cm. Conventional laser pulse 32 has a full width at half maximum amplitude of approximately 450 picoseconds, a wavelength of approximately 0.532 microns, and an average power density in the focal plane of approximately $5 \times 10^{13}$ watts/cm$^2$. However, in other embodiments of the invention, the driving conventional laser pulse may have a full width at half maximum amplitude in the range from 100 to 1000 picoseconds, a wavelength in the range from 0.2 to 0.6 microns, and a power density in the range from $10^{12}$ to $10^{16}$ watts/cm$^2$. Laser pulses such as this are supplied routinely by, for example, the NOVETTE laser of the Lawrence Livermore National Laboratory.

The laser gain medium of X-ray laser 30 is ultimately provided by atoms from a substantially flat very thin foil 34 which is shown as deposited on a substantially flat very thin substrate 36. Thin foil 34 is comprised of selenium of approximate density 4.8 gm/cm$^3$ and of approximate thickness 750 Angstroms. Thin substrate 36 is comprised of formvar of approximate density 1 gm/cm$^3$ and of approximate thickness 1500 Angstroms. Formvar, which is used in a generic sense, is comprised of polyvinyl formal resins, has the chemical composition $C_{11}H_{18}O_5$, is manufactured by Shawinigan Resin Corporation of Englewood Cliffs, N.J., and is used for structural integrity. Selenium thin foil 34 is deposited on thin formvar substrate 36 by the process of plasma vapor deposition, which is a well known technique in the art of vacuum metallurgy, although in other embodiments of the invention foil 34 and substrate 36 may be attached by any other appropriate means such as plasma sputtering, ion implantation, and cryogenic condensation. Additionally, in other embodiments of the invention foil 34 may be comprised of any single element selected from the group consisting of all elements having an atomic number in the inclusive range from 20 to 50, and generally have a thickness in the approximate range from 50 to 10,000 Angstroms. Likewise, substrate 36 may in other embodiments be comprised of beryllium or plastic and generally will have a thickness of 5000 Angstroms or less. Plastic is defined herein as any of numerous organic synthetic or processed materials that are molded, cast, extruded, drawn or laminated into objects, films, or filaments. Organic materials are limited herein to materials containing only the elements carbon, hydrogen, oxygen and nitrogen. Plastics are stable in use at ordinary temperatures. It is emphasized that in many embodiments of the invention thin foil 34 will be free-standing and not associated with any substrate. Thus, substrate 36 is not absolutely necessary to the working of the invention. The thickness and composition of the foil and substrate are functions of the parameters of the driving high power optical laser pulse.

Selenium foil 34 and formvar substrate 36 are mounted upon an upper spacer 38 and a lower spacer 40. Spacers 38 and 40 are each comprised of any structural material such as aluminum, iron or gold, for example. The mounting may be by any appropriate means, such as, for example, gluing. The dimensions of spacers 38 and 40 are not critical, so long as they are long enough to make full use of the rectangular focal plane of conventional laser pulse 32. For example, spacers 38 and 40 may each have the approximate dimensions of 0.2 cm by 5 cm by 5 cm, and may be separated by approximately 10,000 microns.

Figure 5:
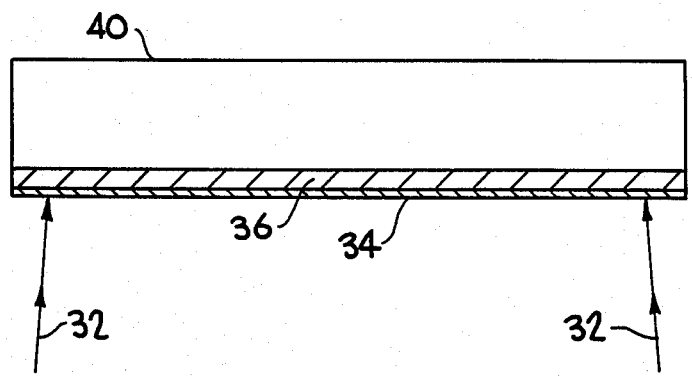
FIG. 5 is a top view of the X-ray laser of FIG. 4, taken generally along line 5—5 in FIG. 4, showing the foil, substrate and driving laser beam.
Figure 6:
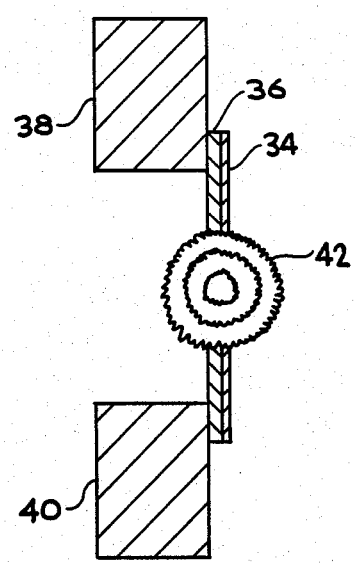
FIG. 6 is a side view of the X-ray laser of FIG. 4, taken generally along line 6—6 in FIG. 4, showing the plasma gain medium.
Figure 7:
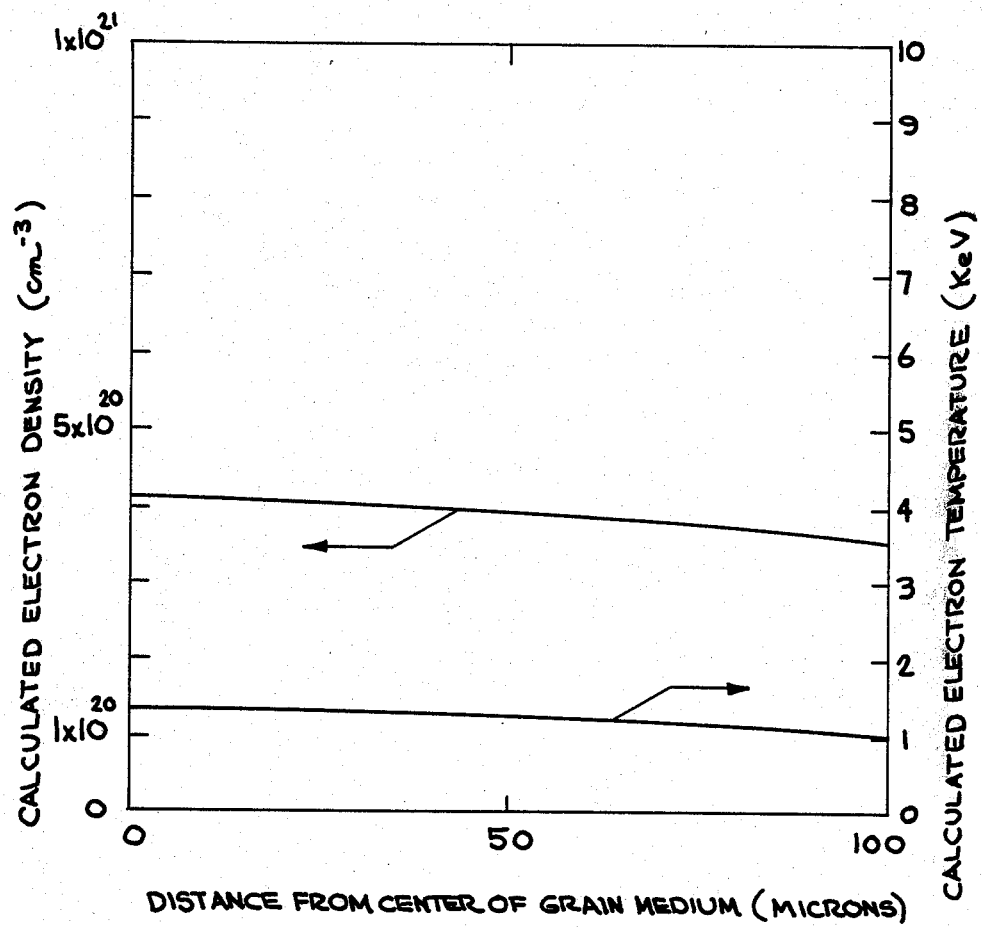
FIG. 7 is a graph showing electron density and temperature as a function of distance across the gain medium of FIG. 6.

Reference is now made to FIGS. 5 and 6 which are a top and a side view, respectively, of the X-ray laser of FIG. 4, showing portions of very thin selenium foil 34 and very thin formvar substrate 36. FIG. 5 shows driving conventional laser pulse 32 impinging on foil 34. As shown in FIG. 6, the illuminated portion of selenium foil 34 explodes as laser pulse 32 heats or burns through it, creating thereby an X-ray laser plasma gain medium 42. Cylindrically shaped gain medium 42 is generally ionized to a neon-like state and has essentially flat electron temperature and density characteristics, as shown in the electron temperature and density versus distance across the gain medium graphs of FIG. 7. As shown, the electron density and temperature profiles each have a scale length of at least 100 microns. The scale length of a variable quantity is herein defined as the distance over which it undergoes an e-fold change in magnitude. It is noted that e is a number approximately equal to 2.7. Plasma gain medium 42 exists in a substantially unchanging state for at least 200 picoseconds, which is an appreciably long period of time. It is noted that in 200 picoseconds light travels about 6 centimeters. The generally flat temperature and density profiles allow a laser amplified X-ray beam to propagate in a straight direction all along the line focus direction of uniform gain in medium 42, remaining at all times in a region of high gain. For the embodiment of the invention shown and described, the product of the gain multiplied by the effective length of the X-ray amplifying medium is well in excess of four.

Consequently, X-ray gain medium 42 contains a large number of selenium atoms in the neon-like state, and has generally flat electron density and temperature profiles. The preferred embodiment of the invention, as herein described, has been constructed and tested in a series of experiments conducted during the Summer of 1984 at the NOVETTE laser facility of the Lawrence Livermore National Laboratory. These experiments have unequivocally established that the X-ray laser of this invention successfully produces X-ray laser pulses. Consequently, the X-ray laser of this invention is the world's first known successfully demonstrated laboratory X-ray laser. This series of experiments also successfully demonstrated X-ray laser emission by X-ray lasers, made in accordance with the invention, that had irradiated foils comprised of yttrium.

It is thus appreciated that in accordance with the invention as herein described and shown in FIGS. 4 to 7, an operational conventional-laser-driven electron collisionally excited single pass X-ray laser is provided that establishes a gain medium that coherently laser amplifies 3p–3s transition X-ray radiation along an approximately linear path.

Figure 10:
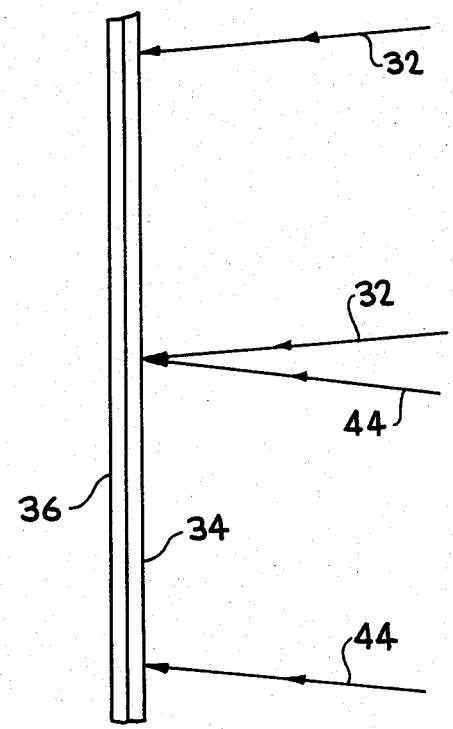
FIG. 10 is a partial top view of an X-ray laser with dual beam thin foil illumination from a single side, in accordance with the invention.
Figure 8:
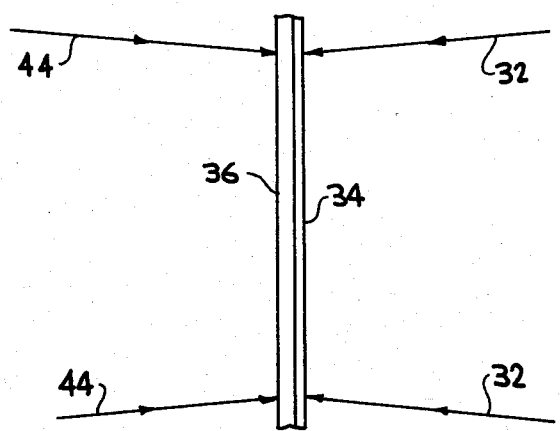
FIG. 8 is a partial top view of an X-ray laser with two-sided thin foil illumination, in accordance with the invention.
Figure 9:
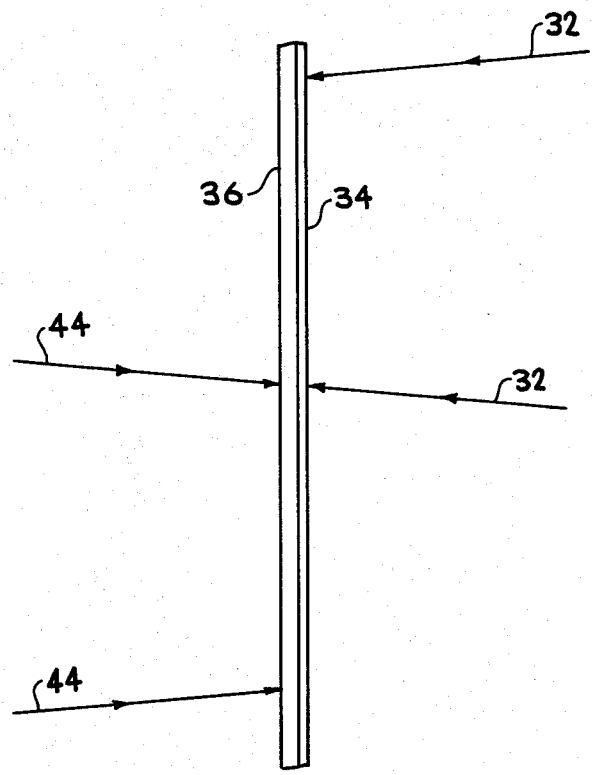
FIG. 9 is a partial top view of an X-ray laser with two-sided generally abuttingly adjacent and lengthwise thin foil illumination, in accordance with the invention.

The foregoing description of a preferred embodiment of the invention has been presented for purposes of illustration and description. It is not intended to be exhaustive or to limit the invention to the precise form disclosed, and obviously many modifications and variations are possible in light of the above teaching. For example, as shown in FIG. 8, which corresponds to FIG. 5, previously discussed, foil 34 and substrate 36, in addition to conventional laser pulse 32, may also be driven by a second conventional laser pulse 44, to thereby achieve two sided illumination. This two sided illumination technique compensates for any random non-uniformities in either of the driving laser beams that may happen to be present. The characteristics and specifications of laser beam 44 are substantially similar to those given hereinabove for conventional laser beam 32. Additionally, as shown in FIG. 9, which is yet another partial top view of foil 34 and substrate 36, laser beams 32 and 44 may be partially or totally offset to illuminate generally abuttingly adjacent portions of foil 34 that are positioned lengthwise to one another. This technique increases the length of the X-ray gain medium of the X-ray laser of the invention. Furthermore, as shown in FIG. 10, which is again yet another partial top view of foil 34 and substrate 36, laser beams 32 and 44 may illuminate generally abuttingly adjacent portions of foil 34, that are positioned lengthwise to one another, from the same side. Again, the use of a substrate in association with foil 34 in these two-sided illumination techniques is not absolutely necessary, the substrate merely providing structural integrity for the foil. Finally, it should be pointed out that the method and apparatus of this invention may be employed not only with the electron collisonally excited X-ray laser technique, but also with other X-ray laser schemes requiring flat electron density and temperature profiles over a long distance for amplification. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. A method, for providing a high power optical laser driven electron collisionally excited single pass X-ray laser gain medium that coherently laser amplifies 3p–3s transition X-ray radiation along an approximately linear path within said gain medium, the method comprising the step of:

illuminating a thin foil with a first beam of line focused high power optical laser radiation, with said foil comprised of a single element having an atomic number in the inclusive range from 20 to 50, with said illuminating occurring on a first side of said foil, and with said illuminating occurring on a first long and thin generally rectangular portion of said foil, thereby producing a generally cylindrically shaped plasma having an essentially uniform electron density, having an essentially uniform electron temperature, and existing over at least an appreciable long period of time of about 200 picoseconds, so that said generally cylindrically shaped plasma has essentially no index of refraction gradient to said X-ray radiation, and so that said generally cylindrically shaped plasma contains a density of neon-like ions sufficient to provide said X-ray laser gain medium.

2. A method, for providing an X-ray laser gain medium, as recited in claim 1, further comprising the additional step of:
irradiating said thin foil with a second beam of line focused, high power optical laser radiation, with said irradiating occurring on a second side of said foil, with said irradiating occurring on said first long and thin generally rectangular portion of said foil, and with said illuminating step and said irradiating step each occurring at about the same time, to thereby provide two-sided illumination for said first generally rectangular portion of said foil.

3. A method, for providing an X-ray laser gain medium, as recited in claim 1, further comprising the additional step of:
irradiating said thin foil with a second beam of line focused high power optical laser radiation, with said irradiating occurring on either said first side of said foil or on a second side of said foil, with said irradiating occurring on a second long and thin generally rectangular portion of said foil, with said illuminating step and said irradiating step each occurring at about the same time, and with said first and said second generally rectangular portions of said foil being generally abuttingly adjacent to each other and positioned lengthwise along said approximately linear path, to thereby increase the length of said X-ray laser gain medium that coherently amplifies 3p–3s transition X-ray radiation along an approximately linear path within said gain medium.

4. A method, for providing an X-ray laser gain medium, as recited in claim 1, further comprising the additional step of:
attaching said free-standing thin foil onto a thin substrate for the purpose of improving the structural integrity of said thin foil, with said substrate comprised of a material selected from the group consisting of formvar, beryllium and plastic, and with said attaching step occurring prior to said illuminating step.

5. A high power optical laser driven electron collisionally excited single pass X-ray laser, that provides a gain medium that coherently laser amplifies 3p–3s transition X-ray radiation along an approximately linear path within said gain medium, the X-ray laser comprising:
a thin foil comprised of a single element having an atomic number in the inclusive range from 20 to 50; and
means for illuminating said foil with a first beam of line focused, high power optical laser radiation, with said illumination occurring on a first side of said foil, and with said illumination occurring on a first long and thin generally rectangular portion of said foil, to thereby produce a generally cylindrically shaped plasma that has an essentially uniform electron density, that has an essentially uniform electron temperature, and that exists over at least an appreciably long period of time of about 200 picoseconds, with said generally cylindrically shaped plasma having essentially no index of refraction gradient to said X-ray radiation, and with said generally cylindrically shaped plasma containing a density of neon-like ions sufficient to provide said X-ray laser gain medium.

6. An X-ray laser, as recited in claim 5, in which said thin foil has a thickness in the range from 50 to 10,000 Angstroms.

7. An X-ray laser, as recited in claim 5, in which said first beam of line focused, high power optical laser radiation has power density in the range from $10^{12}$ to $10^{16}$ watts/cm$^2$, wavelength in the range from 0.2 to 10.6 microns, and full width at half maximum amplitude in the range from 100 to 1000 picoseconds; and, in which said first illuminated, generally rectangular portion of said foil has a length in the range from 0.05 to 5 centimeters, and a width in the range from 0.005 to 0.1 centimeters.

8. An X-ray laser, as recited in claim 5, further comprising:
means for irradiating said foil with a second beam of line focused, high power optical laser radiation, with said irradiation occurring on a second side of said foil, with said irradiation occurring on said first long and thin generally rectangular portion of said foil, and with said illumination and said irradiation each occurring at about the same time, to provide two-sided illumination for said first generally rectangular portion of said foil.

9. An X-ray laser, as recited in claim 8, further comprising:
a thin substrate comprised of a material selected from the group consisting of formvar, beryllium and plastic, with said foil and said substrate being attached to one another, to improve the structural integrity of said foil.

10. An X-ray laser, as recited in claim 9, in which:
said foil is comprised of selenium approximately 750 Angstroms thick;
said substrate is comprised of formvar approximately 1500 Angstroms thick;
said first beam of line focused, high power optical laser radiation has a power density of approximately $5 \times 15^{13}$ watts/cm$^2$, a wavelength of approximately 0.532 microns, and a full width at half maximum amplutude of approximately 450 picoseconds;
said second beam of line focused, high power optical laser radiation has a power density of approximately $5 \times 10^{13}$ watts/cm$^2$, a wavelength of approximately 0.532 microns, and a full width at half maximum amplitude of approximately 450 picoseconds; and
said first generally rectangular portion of said foil has a length of approximately 1.12 centimeters, and a width of approximately 0.02 centimeters.

11. An X-ray laser, as recited in claim 9, in which said foil is comprised of yttrium.

12. An X-ray laser, as recited in claim 5, further comprising:
means for irradiating said foil with a second beam of line focused high power optical laser radiation, with said irradiation occurring on either said first side of said foil or on a second side of said foil, with said irradiation occurring on a second long and thin generally rectangular portion of said foil, with said illumination and said irradiation each occurring at about the same time, and with said first and said second generally rectangular portions of said foil being generally abuttingly adjacent to each other and positioned lengthwise along said approximately linear path, to increase the length of said X-ray laser gain medium that amplifies 3p–3s transition X-ray radiation along an approximately linear path within said gain medium.

13. An X-ray laser, as recited in claim 9, further comprising:
a thin substrate comprised of a material selected from the group consisting of formvar, beryllium and plastic, with said foil and said substrate being attached to one another, to improve the structural integrity of said foil.

14. An X-ray laser, as recited in claim 13, in said foil is comprised of selenium approximately 750 Angstroms thick;
said substrate is comprised of formvar approximately 1500 Angstroms thick;
said first beam of line focused high power optical laser radiation has a power density of approximately $5 \times 15^{13}$ watts/cm$^2$, a wavelength of approximately 0.532 microns, and a full width at half maximum amplutude of approximately 450 picoseconds;
said second beam of line focused high power optical laser radiation has a power density of approximately $5 \times 10^{13}$ watts/cm$^2$, a wavelength of approximately 0.532 microns, and a full width at half maximum amplitude of approximately 450 picoseconds;
said first generally rectangular portion of said foil has a length of approximately 1.12 centimeters, and a width of approximately 0.02 centimeter; and
said second generally rectangular portion of said foil has a length of approximately 1.12 centimeters, and a width of approximately 0.02 centimeters.

15. An X-ray laser, as recited in claim 13, in which said foil is comprised of yttrium.

16. An X-ray laser, as recited in claim 5, further comprising:
a thin substrate comprised of a material selected from the group consisting of formvar, beryllium and plastic, with said foil and said substrate being attached to one another, to improve the structural integrity of said foil.

17. An X-ray laser, as recited in claim 16, in which said substrate has a thickness of 5000 Angstroms or less.

18. An X-ray laser, as recited in claim 16, in which:
said foil is comprised of selenium approximately 750 Angstroms thick;
said substrate is comprised of formvar approximately 1500 Angstroms thick;
said first beam of line focused, high power optical laser radiation has a power density of approximately $5 \times 10^{13}$ watts/cm$^2$, a wavelength of approximately 0.532 microns, and a full width at half maximum amplitude of approximately 450 picoseconds; and
said first generally rectangular portion of said foil has a length of approximately 1.12 centimeters, and a width of approximately 0.02 centimeters.

19. An X-ray laser, as recited in claim 16, in which said foil is comprised of yttrium.

* * * * *